(12) United States Patent
Kühnlein et al.

(10) Patent No.: US 10,802,295 B2
(45) Date of Patent: Oct. 13, 2020

(54) SPECTACLES (71) Applicant: UVEX ARBEITSSCHUTZ GMBH, Fürth (DE)

(72) Inventors: Florian Kühnlein, Fürth (DE); Helena Angebrandt, Lauf (DE); Markus Wiegler, Nuremberg (DE); Simon Jaschke, Fürth (DE); Tobias Kreitschmann, Oberasbach (DE)

(73) Assignee: UVEX ARBEITSSCHUTZ GMBH, Fürth (DE)

( * ) Notice: Subject to any disclaimer, the term of this patent is extended or adjusted under 35 U.S.C. 154(b) by 100 days.

(21) Appl. No.: 16/319,949

(22) PCT Filed: Mar. 13, 2018

(86) PCT No.: PCT/EP2018/056228
§ 371 (c)(1),
(2) Date: Jan. 23, 2019

(87) PCT Pub. No.: WO2018/172139
PCT Pub. Date: Sep. 27, 2018

(65) Prior Publication Data
US 2019/0265509 A1 Aug. 29, 2019

(30) Foreign Application Priority Data
Mar. 20, 2017 (DE) .......... 10 2017 204 612

(51) Int. Cl.
*G02C 5/14* (2006.01)
*G02C 5/22* (2006.01)

(52) U.S. Cl.
CPC .......... *G02C 5/146* (2013.01); *G02C 5/2209* (2013.01); *G02C 2200/04* (2013.01); *G02C 2200/20* (2013.01)

(58) Field of Classification Search
CPC ....................................................... G02C 5/146
(Continued)

(56) References Cited

U.S. PATENT DOCUMENTS 3,594,073 A   7/1971   Liautaud
5,791,015 A   8/1998   Wandinger
(Continued)

FOREIGN PATENT DOCUMENTS

CN   201477307 U   5/2010
CN   203882032 U   10/2014
(Continued)

*Primary Examiner* — James C. Jones
(74) *Attorney, Agent, or Firm* — McGlew and Tuttle, P.C.

(57) ABSTRACT

A pair of spectacles including a lens arrangement having two lateral temple arm bearing arrangements. Each temple arm bearing arrangement has a first hinge lug having a first bearing opening and a second hinge lug having a second bearing opening, and at least one locking member insertion opening configured in the first or second hinge lug. The spectacles additionally comprise two temple arms, which respectively have a temple arm main body, and a bearing pin integrally connected thereto, which bearing pin, in the assembled state, is pivotably connected to the first and second bearing opening of the respective temple arm bearing arrangement. Each temple arm further has at least one locking member, which, in the assembled state, is arranged between the hinge lugs of the respective temple arm bearing arrangement and, in a pivot position, lockingly holds together this temple arm and the lens arrangement.

15 Claims, 12 Drawing Sheets

(58) Field of Classification Search
USPC .......................................................... 351/153
See application file for complete search history.

(56) References Cited

U.S. PATENT DOCUMENTS

| | | |
|---|---|---|
| 2010/0321629 A1 | 12/2010 | Chen |
| 2011/0109872 A1 | 5/2011 | Chen |
| 2016/0223833 A1 | 8/2016 | Chen |
| 2016/0299352 A1* | 10/2016 | Dai ..................... G02C 5/2209 |

FOREIGN PATENT DOCUMENTS

| | | |
|---|---|---|
| DE | 44 21 309 C1 | 6/1995 |
| JP | H09 325 303 A | 12/1997 |
| KR | 20110131884 A | 12/2011 |
| KR | 2012 0024327 A | 3/2012 |

* cited by examiner

SPECTACLES

CROSS REFERENCE TO RELATED APPLICATIONS

This application is a United States National Phase Application of International Application PCT/EP2018/056228 filed Mar. 13, 2018 and claims the benefit of priority under 35 U.S.C. § 119 of German Patent Application Serial No. DE 10 2017 204 612.0, filed on Mar. 20, 2017, the entire contents of which are incorporated herein by reference.

FIELD OF THE INVENTION

The invention relates to a pair of spectacles, in particular industrial safety spectacles. It can also be provided for other spectacles, such as sports spectacles, optical spectacles or the like. The invention further relates to a corresponding assembly method for assembling the spectacles.

BACKGROUND OF THE INVENTION

From the prior art, a multiplicity of different spectacles is known.

DE 44 21 309 C1 discloses a hinge connection between a temple arm and a mount for spectacle lenses.

US 2016/0299352 A1 discloses a hinged joint between an end piece, which adjoins a spectacle frame, and a temple arm.

From US 2010/0321629 A1, a spectacle hinged joint arrangement comprising a trunnion and a trunnion seat is known.

A connecting arrangement for temple arms which is known from US 2016/0223833 A1 comprises a trunnion, which is integrally connected to a temple arm via a connecting portion.

JP 09325303 A discloses a temple arm which, on one side, bears a trunnion.

SUMMARY OF THE INVENTION

The object of the invention is to provide a pair of spectacles which is particularly resistant or particularly robust. This applies in particular to its temple arm bearing arrangements. In addition, the spectacles should be able to be assembled or put together in a simple, in particularly automated, manner. A corresponding method for assembling the spectacles should additionally be provided. The method should in particular be extremely simple, fast and automated.

This object is achieved according to the invention by a pair of spectacles, in particular industrial safety spectacles, comprising a lens arrangement having two lateral temple arm bearing arrangements, wherein each of the temple arm bearing arrangements has a first hinge lug having a first bearing opening, a second hinge lug having a second bearing opening situated opposite the first bearing opening, and at least one locking member insertion opening configured in the first hinge lug or second hinge lug, and comprising two temple arms, which respectively have a temple arm main body, a bearing pin integrally connected to the respective temple arm main body, which bearing pin in an assembled state, is pivotably connected to the first bearing opening and the second bearing opening of the respective temple arm bearing arrangement, and has at least one latching projection having at least one latching surface, which latter is oriented counter to a temple arm assembly direction and, in an assembled state of the temple arm located in the temple arm assembly position, is facing toward the adjacent hinge lug in order to prevent disassembly, and at least one locking member, which in the assembled state, is arranged between the hinge lugs of the respective temple arm bearing arrangement, and in a pivot position of the respective temple arm that is different from a temple arm assembly position, holds together this temple arm and the lens arrangement, and comprising a temple arm stroke for moving the respective temple arm into its adjacent end position.

Furthermore, this object is achieved by a method for assembling spectacles as claimed in one of the previous claims, comprising the steps of mutually orienting the at least one locking member of the respective temple arm and the associated at least one locking member insertion opening of the lens arrangement in the direction of pivot, and guiding the respective bearing pin through the associated hinge lug comprising the locking member insertion opening, with simultaneous guidance of the at least one locking member through the at least one locking member insertion opening, wherein each bearing pin has at least one latching projection having at least one latching surface, which latter is oriented counter to a temple arm assembly direction and, in an assembled state of the temple arm located in the temple arm assembly position, is facing toward the adjacent hinge lug in order to prevent disassembly, wherein the at least one latching projection—when the bearing pin is guided through the hinge lug having the at least one latching member insertion opening—resiliently widens this hinge lug at least in some areas, wherein the spectacles have a temple arm stroke for moving the respective temple arm into its adjacent end position.

The key element lies in the fact that each temple arm already has an own bearing pin and at least one locking member, which, in a pivot position or pivoted position different from the temple arm assembly position, such as, in particular, in an infolded temple arm transport position and/or an outfolded temple arm wearing position, prevents accidental detachment of the temple arm and of the lens arrangement one from the other and preferably, if need be, acts on the respective temple arm bearing arrangement. The at least one locking member here allows a relative pivot movement between the lens arrangement and the corresponding temple arm. It preferably prevents or limits a relative movement of the lens arrangement and of the temple arm along the bearing pin of this same. The requirements pertaining to the mechanical strength of the spectacles are in this way fulfilled. The bearing pin replaces a separate bearing part, such as a metal or plastics rivet.

The temple arms are preferably pivotable between the temple arm transport position and the temple arm wearing position, by means of the temple arm bearing arrangements, about a pivot axis predefined by the respective temple arm bearing arrangement.

The first and second bearing opening of the respective temple arm bearing arrangement are favorably mutually aligned. They are preferably, at least in some areas, cylindrically configured.

The at least one locking member is preferably bar-like and, in particular, dimensionally stable. It is expedient if the at least one locking member insertion opening is slit-like.

The hinge lugs are favorably of block-like or plate-like design. They are preferably connected to or configured in one piece with a spectacle frame, at least one spectacle frame part or at least one spectacle lens of the lens arrangement.

Favorably, the spectacles have only three (main) components in total, namely the lens arrangement and the two temple arms.

It is of advantage if the spectacles consist fully of plastic and, in particular, are free from metal. The spectacles are preferably symmetrical with respect to a plane of symmetry.

It is of advantage if the lens arrangement has two spectacle lenses. According to an alternative embodiment, the lens arrangement has precisely one one-piece, continuous spectacle lens.

The lens arrangement is inserted, for instance, in a separate spectacle frame. Alternatively, the lens arrangement and a spectacle frame are integrally connected to each other. Alternatively, the lens arrangement is frameless. Favorably, the lens arrangement is formed of a plastics material.

The temple arms are preferably identically structured in terms of their design. It is expedient if each temple arm is in one piece. Preferably, each temple arm is formed of a plastics material.

The at least one latching projection is preferably of ramp-like or boss-like design. In the assembled state of the temple arm located in the temple arm assembly position, the at least one latching projection preferably back-grips or overgrips the adjacent hinge lug. Favorably, the at least one latching projection is then facing toward the hinge lug, which has the at least one locking member insertion opening. The at least one latching projection simplifies, in particular, the assembly.

Favorably, the at least one latching projection, when the bearing pin is guided through the hinge lug having the at least one locking member insertion opening, resiliently widens this hinge lug, at least in some areas. This hinge lug then springs back into its original state.

The temple arm stroke aids a folding or unfolding of the temple arm into its adjacent end position, in particular into its transport position or wearing position.

Preferably, the temple arm stroke is formed by a corresponding geometric overlay between the lens arrangement and the respective temple arm, in particular between at least one hinge lug of the lens arrangement and the respective temple arm main body. It is expedient if, for this purpose, on at least one hinge lug is configured a temple arm stroke cam, which, at least in part and/or periodically, is facing toward the respective temple arm main body. The temple arm main body in turn favorably has at least one abutment projection for the at least regional and/or periodic, in particular permanent, in particular firm, bearing contact against the temple arm stroke cam or support against the same during a relative pivot movement between the lens arrangement and the respective temple arm, whereby a temple arm stroke is formed.

Alternatively, a reverse arrangement exists, so that on the respective temple arm main body is configured a corresponding temple arm stroke cam, and the at least one assigned hinge lug has at least one corresponding abutment projection.

Alternatively, the temple arm stroke is obtainable, for instance, by a cam-like, in cross section non-round embodiment of the bearing pin, and/or by a corresponding, in cross section non-round embodiment of the first and/or second bearing opening.

The embodiment according to which the at least one locking member adjoins the bearing pin of the respective temple arm is extremely robust. In particular, the at least one locking member is particularly robust According to a preferred embodiment, the at least one locking member is spaced from at least one end of the bearing pin of the respective temple arm. It is expedient if the at least one locking member is spaced from both ends of the bearing pin of the respective temple arm. It is preferably arranged roughly centrally in relation to a length of the bearing pin.

The spectacles configured such that the at least one locking member insertion opening laterally adjoins the bearing opening of the respective hinge lug are extremely easy to assemble. The at least one locking member insertion opening preferably interrupts in some areas an otherwise closed peripheral rim of the respective bearing opening, for instance over an angular range between 5° and 90°, more preferably between 10° and 45°.

The embodiment configured such that the at least one locking member insertion opening is open laterally outwardly opposite to the associated bearing opening creates a hinge block which is elastically resilient. This is easy to assemble. The at least one locking member insertion opening favorably opens out in the direction of the plane of symmetry or principal plane of the spectacles.

The configuration according to which the at least one locking member insertion opening is offset from a temple arm wearing position in a direction of pivot prevents accidental detachment of the temple arm from the lens arrangement when the spectacles are being worn by a user. The spectacles are particularly user-friendly and mechanically robust.

The at least one supporting body via which each bearing pin is connected to the respective temple arm main body is preferably plate-like. It preferably adjoins at the bottom the respective temple arm main body.

The spectacles configured such that the at least one supporting body forms an insertion stop for the bearing pin upon introduction of the same into the respective temple arm bearing arrangement are extremely easy to assemble.

The spectacles configured such that each temple arm is assemblable by a linear insertion movement are particularly easily assemblable. In particular, an in particular complete, mechanized or automated assemblability is possible. Complex assembly movements are not necessary. The assembly can be performed in an extremely cost-effective manner.

The method step according to which a pivoting of the temple arm and of the at least one locking member relative to each other in order to hold together the lens arrangement and the temple arm favorably concludes the assembly process.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
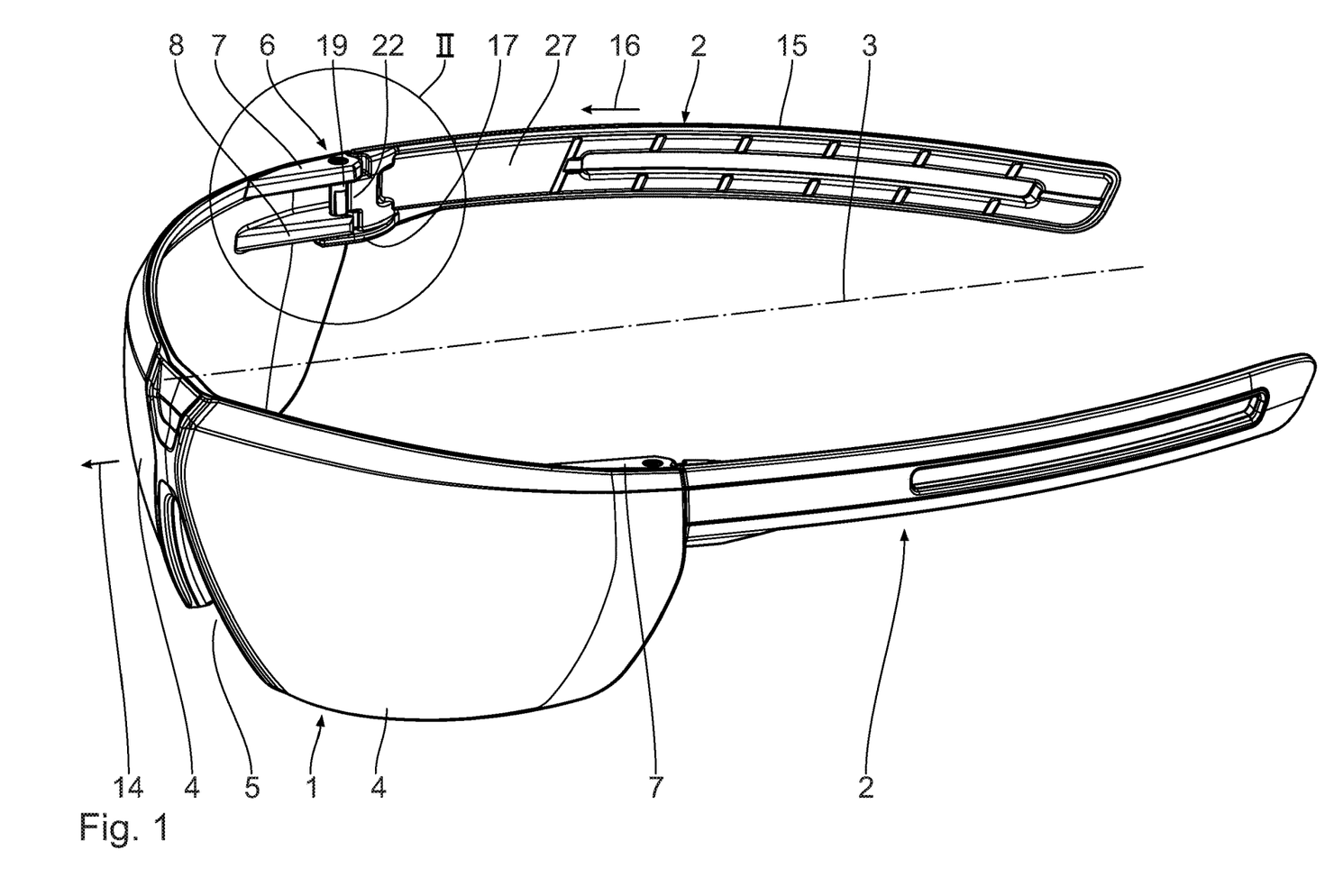
FIG. 1 is a perspective view of a pair of spectacles according to the invention, wherein the temple arms thereof are in their fully outfolded wearing position.
Figure 2:
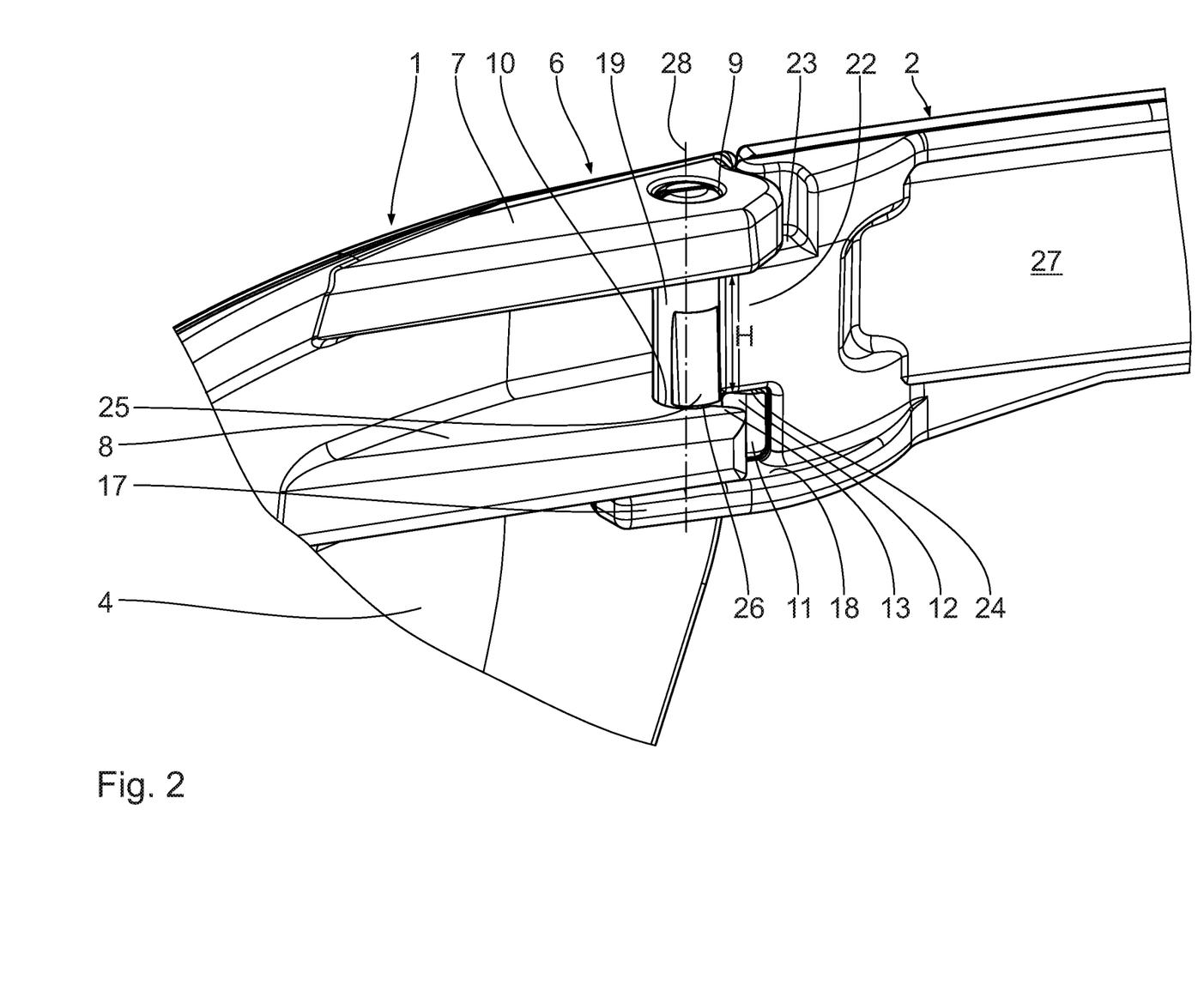
FIG. 2 is an enlarged scale view of detail II of the spectacles which is labeled in FIG. 1.
Figure 3:
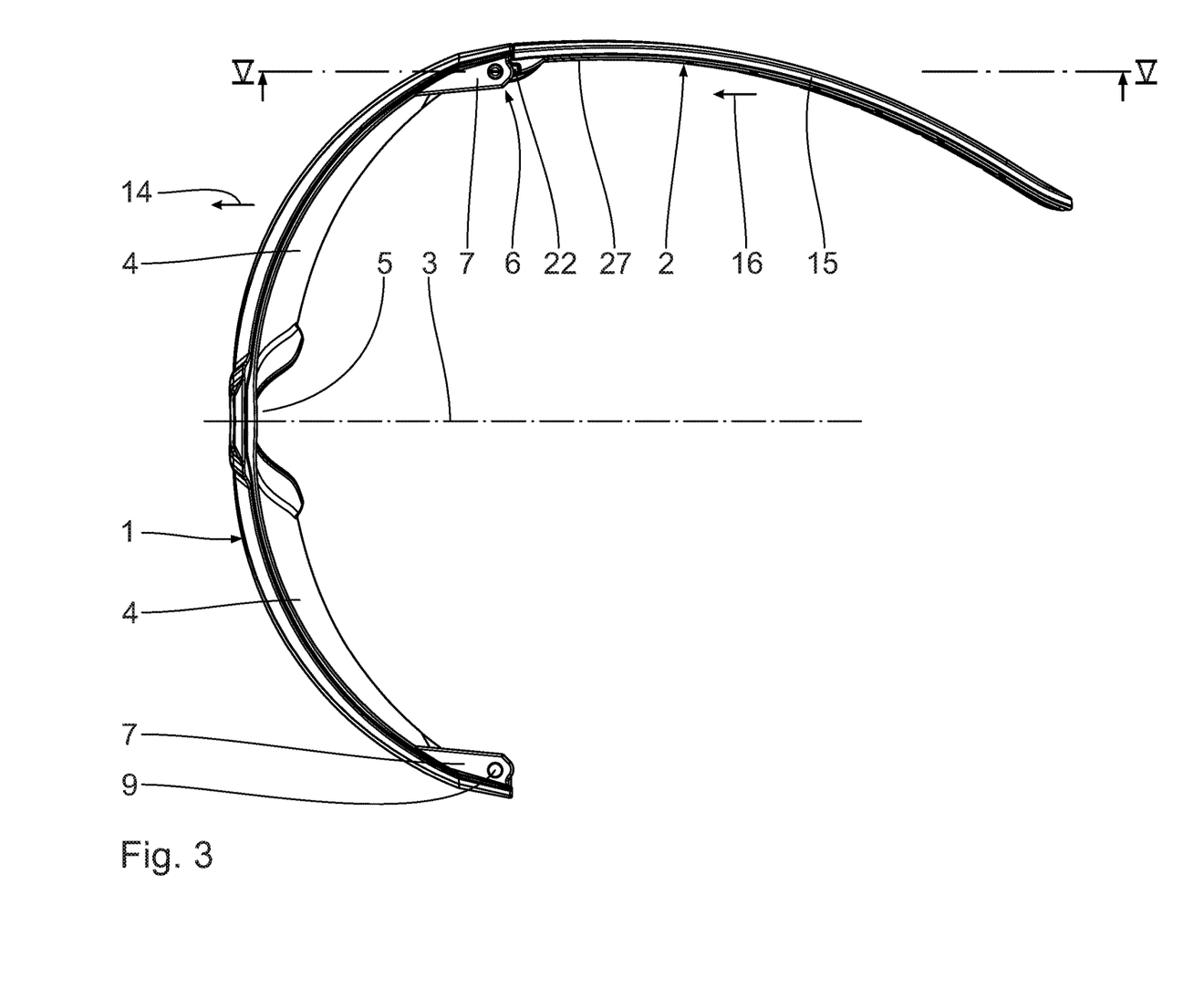
FIG. 3 is a top view of the spectacles shown in FIG. 1, wherein only one temple arm is represented.
Figure 4:
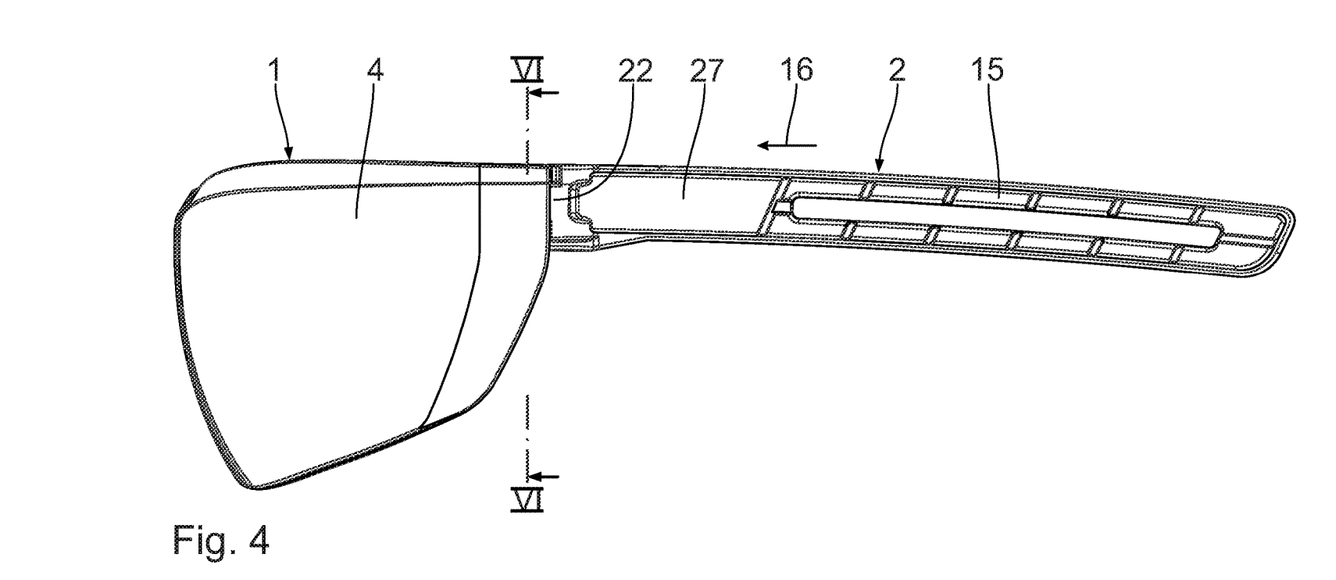
FIG. 4 is a side view of the spectacles represented in FIG. 3, wherein the temple arm is shown from the inside.
Figure 5:
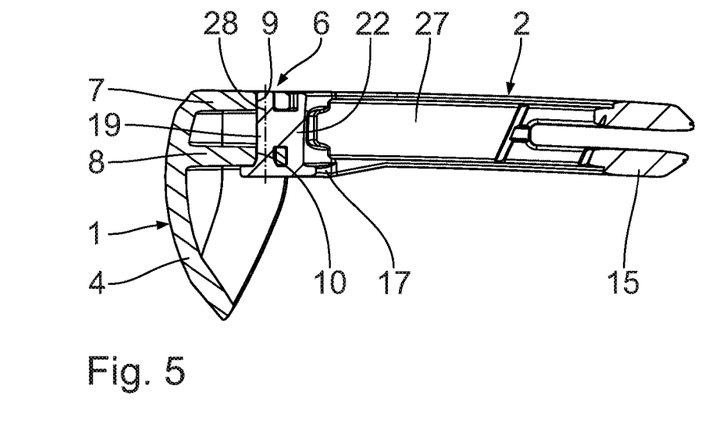
FIG. 5 is a sectional view in accordance with the sectional line V-V represented in FIG. 3.
Figure 6:
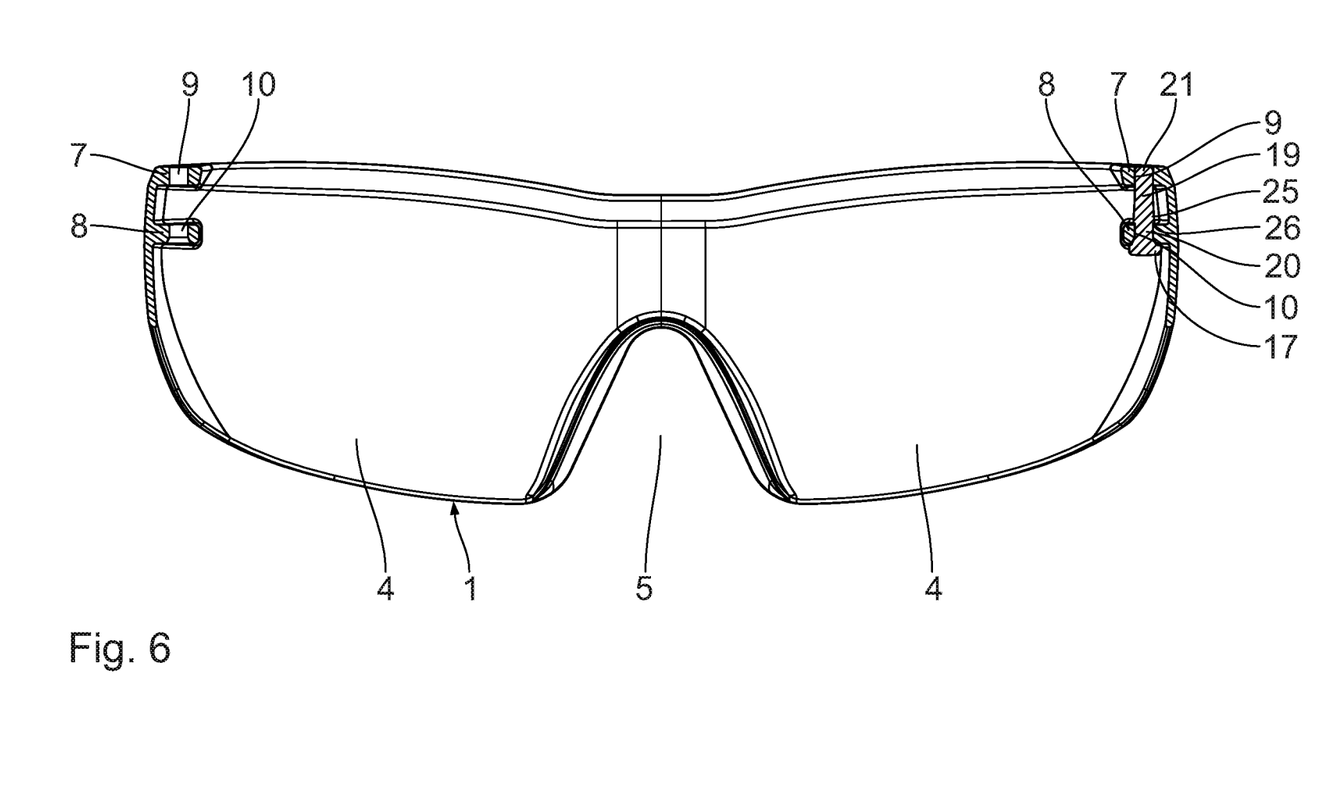
FIG. 6 is a sectional view in accordance with the sectional line VI-VI represented in FIG. 4.
Figure 7:
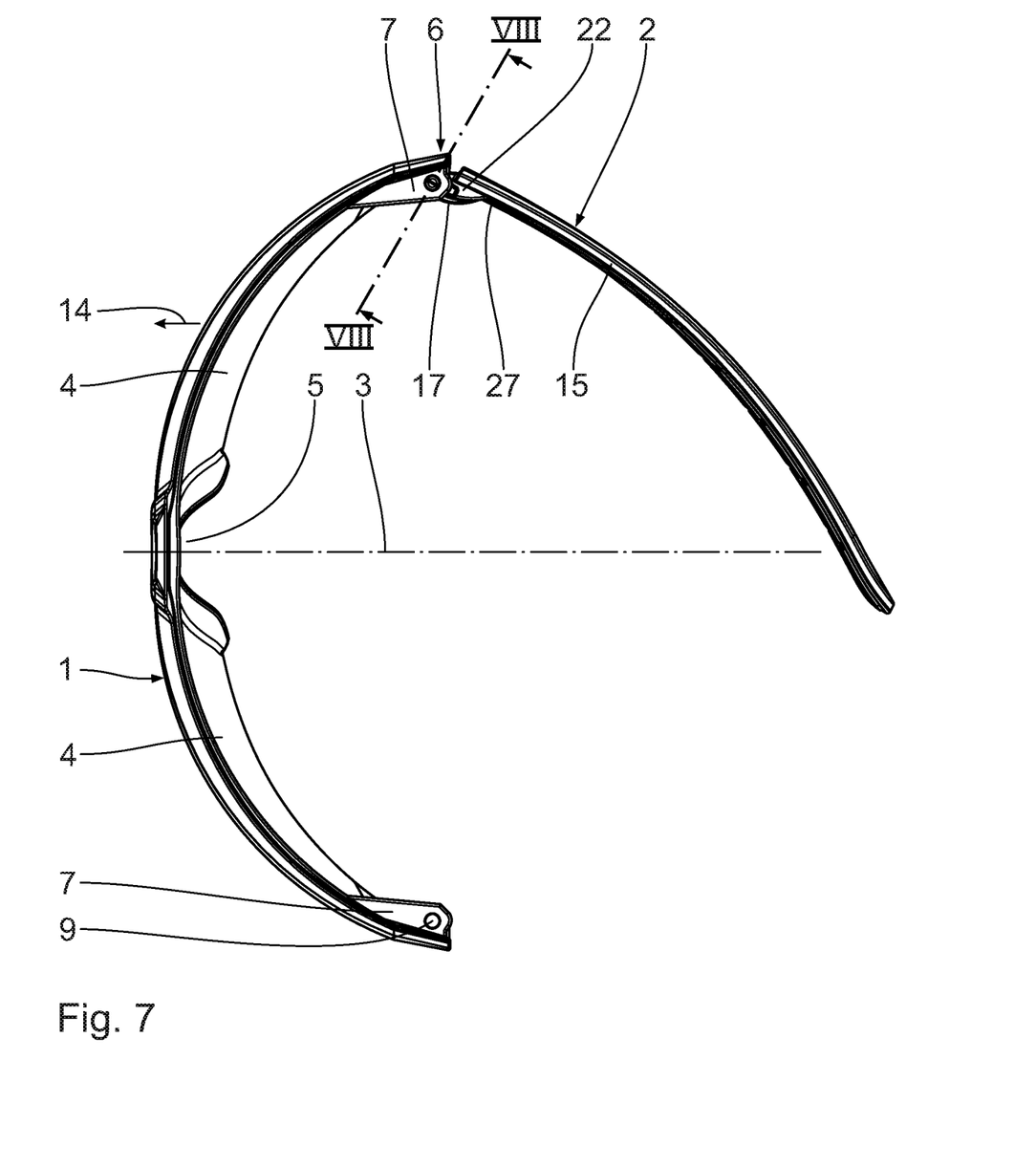
FIG. 7 is a top view in accordance with FIG. 3, wherein the temple arm is somewhat infolded.
Figure 8:
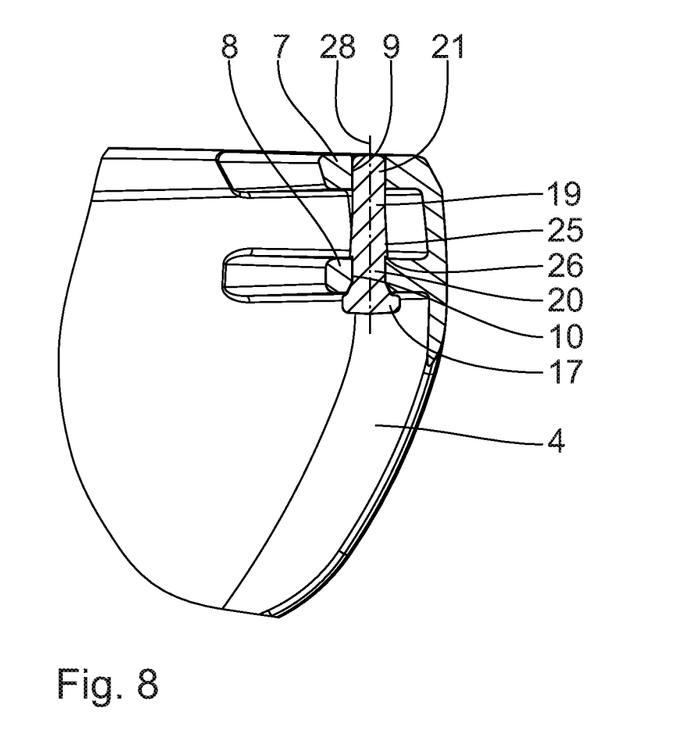
FIG. 8 is a sectional view in accordance with the sectional line VIII-VIII represented in FIG. 7.

A pair of spectacles represented in its entirety in FIG. 1 comprises a lens arrangement 1 and two temple arms 2 laterally hinged to the lens arrangement 1. The spectacles are symmetrical with respect to a plane of symmetry 3 which runs centrally through the lens arrangement 1.

The lens arrangement 1 has two spectacle lenses 4, which are arranged side by side. Between the spectacle lenses 4, the lens arrangement 1 has a nose receptacle 5 for receiving a nose of a user (not represented).

The lens arrangement 1 further comprises two mutually spaced outer temple arm bearing arrangements 6. The temple arm bearing arrangements 6 are disposed at the end on the inner side of the lens arrangement 1. They are preferably identical in design.

Each temple arm bearing arrangement 6 has an upper, first hinge lug 7 and a therefrom distanced lower, second hinge lug 8. The first hinge lug 7 and the second hinge lug 8 run at a distance apart, one above the other, with the formation of a locking member receptacle. The hinge lugs 7, 8 of the temple arm bearing arrangements 6 protrude in the direction toward the plane of symmetry 3 or toward one another and extend parallel to each other.

In each first hinge lug 7 is configured a cylindrical, first bearing opening 9, which favorably is continuous.

In each second hinge lug 8 is configured a cylindrical, second bearing opening 10, which is aligned with the first bearing opening 9 of the respective temple arm bearing arrangement 6 and is continuous. In addition, in each second hinge lug 8 is configured a locking member insertion opening 11, which laterally or peripherally adjoins the associated second bearing opening 10. The locking member insertion opening 11 passes through the second hinge lug 8 over the total thickness or height thereof. In addition, the locking member insertion opening 11 opens out laterally outwardly opposite to the second bearing opening 10.

Each locking member insertion opening 11 is delimited by a first lead-in wall 12 and a second lead-in wall 13, situated opposite the first lead-in wall 12, of the second hinge lug 8. The lead-in walls 12, 13 of the respective second hinge lug 8 run at a distance apart. Adjacent to the respective second bearing opening 10, the lead-in walls 12, 13 of the second hinge lug 8 have an angular spacing which lies between 5° and 45°. The lead-in walls 12, 13 of the respective second hinge lug 8 extend from the respective second bearing opening 10 counter to a direction of view 14 of the spectacles. They form with the plane of symmetry 3 an angle which lies between 15° and 45°, more preferably between 20° and 40°.

Each temple arm 2 has a temple arm main body 15 which extends along a temple arm principal direction 16.

Protruding at the bottom from the end of each temple arm main body 15 is a supporting plate 17, on which, at the top, is configured a flat sliding surface 18.

Protruding perpendicularly upward from each sliding surface 18 is a bearing pin or trunnion 19, which has adjacent to the sliding surface 18 a rotationally symmetric bearing foot 20, and adjacent to its upper, free end a cylindrical bearing head 21.

Each temple arm 2 further has a bar-like locking member 22, which runs between the respective temple arm main body 15 and the adjacent bearing pin 19. Each locking member 22 has perpendicular to the temple arm principal direction 16 a height H which corresponds to the mutual spacing of the first hinge lugs 7 and second hinge lugs 8. Each locking member 22 has an upper locking surface 23 and a lower locking surface 24 running opposite to the associated upper locking surface 23. The locking surfaces 23, 24 of each locking member 22 run flatly and parallel to each other.

Adjacent to each locking member 22, protruding peripherally in a laterally outward direction from each bearing pin 19 is a latching projection 25, which has a downwardly directed latching surface 26. Each latching projection 25 is arranged between the bearing foot 20 and the bearing head 21 of the associated bearing pin 19. Each latching projection 25 extends over an angular range from 5° to 40°. Each latching projection 25 protrudes substantially perpendicularly in relation to the adjacent locking member 22 from an inner side 27 of the temple arm 2.

Figure 14:
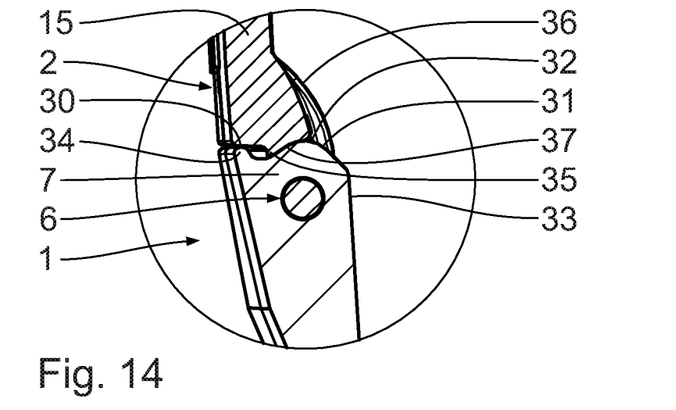
FIG. 14 is an enlarged sectional view through a bearing region of the spectacles according to the invention in order to illustrate a temple arm stroke, wherein the temple arm is fully outfolded.
Figure 15:
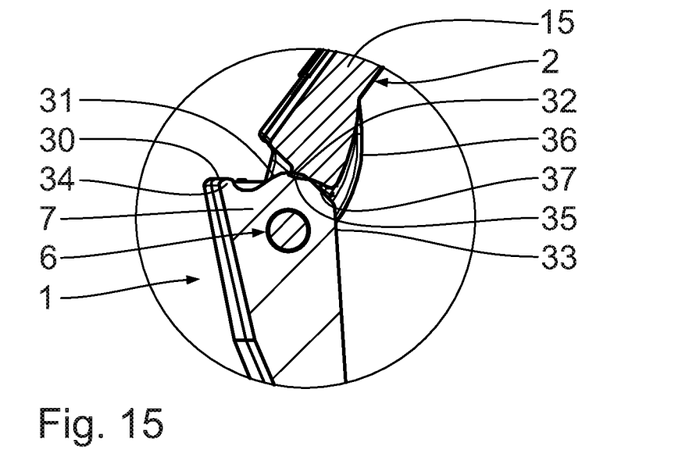
FIG. 15 is a sectional view in accordance with FIG. 14, wherein the temple arm is somewhat infolded.
Figure 16:
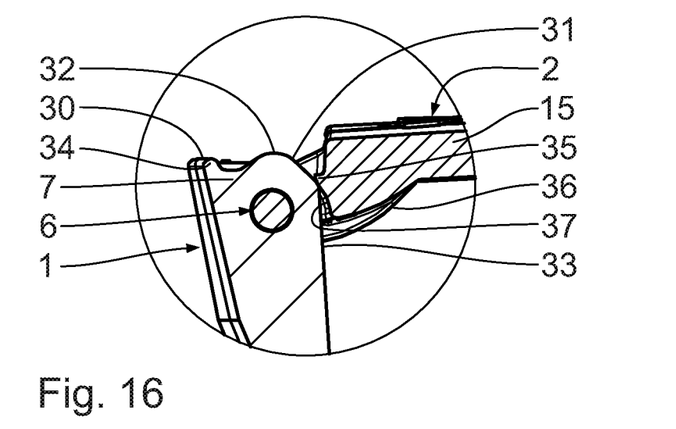
FIG. 16 is a sectional view in accordance with FIG. 14, wherein the temple arm is fully infolded.

As is shown, in particular, by FIGS. 14 to 16, the lens arrangement 1, in each temple arm bearing arrangement 6, has on the outside a pivot stop 30, which is designed as a projection and protrudes counter to the direction of view 14. Preferably, each pivot stop 30 is configured laterally on the respective first hinge lug 7.

In addition, the lens arrangement 1, in each temple arm bearing arrangement 6, has a free temple arm stroke cam 31, which is preferably configured at least on the respective first hinge lug 7 and ends/begins adjacent to the pivot stop 30. Each temple arm stroke cam 31 is facing counter to the direction of view 14. It runs in some areas at a distance around the first bearing opening 9 and is convexly curved. Each temple arm stroke cam 31 deviates in its course from a circular arc and has a substantially central crown 32, which is configured distanced from an inner end region 33, facing toward the plane of symmetry 3, of the respective first hinge lug 7, and from an outer end region 34, facing away from the plane of symmetry 3, of the respective first hinge lug 7 or from the pivot stop 30.

Each temple arm main body 15 has on its hinged-joint-side end region an abutment projection 35. Each abutment projection 35 is here disposed in a central (transverse) region of the temple arm main body 15. Each abutment projection 35 is adjoined in the direction of an inner wall 36 of the respective temple arm 2 by a supporting surface 37 of the temple arm main body 15.

In the assembled state, each supporting plate 17 undergrips the second hinge lug 8. Each sliding surface 18 bears slidingly against the bottom of the second hinge lug 8 or it is arranged adjacent to the second hinge lug 8.

Figure 11:
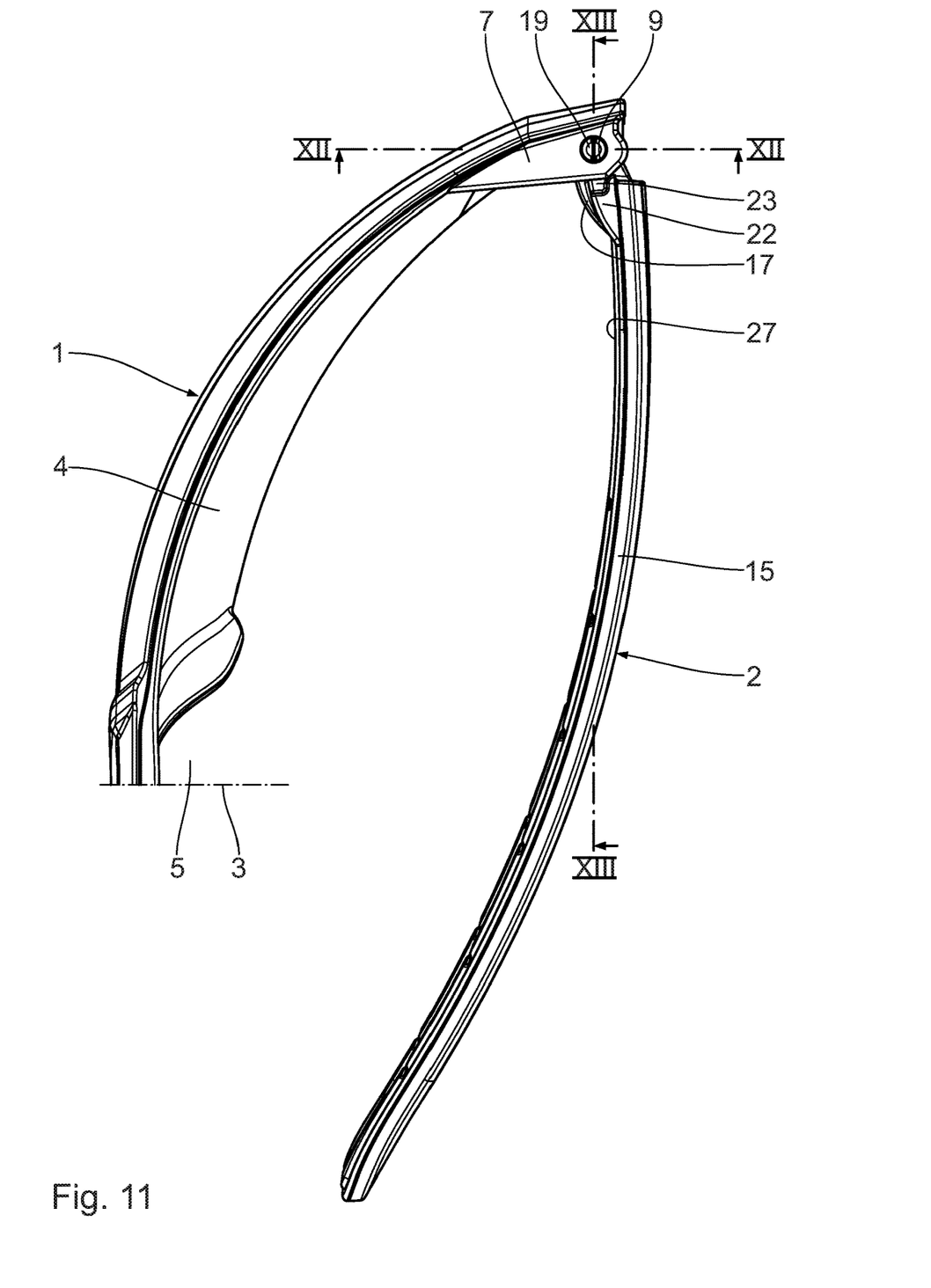
FIG. 11 is a side view resembling FIG. 3, wherein the temple arm is in its fully infolded transport position.
Figure 12:
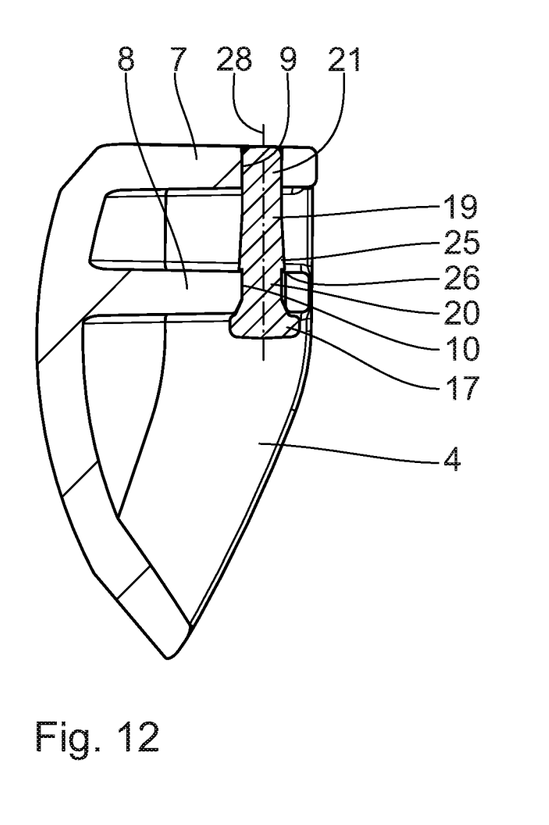
FIG. 12 is a sectional view in accordance with the sectional line XII-XII represented in FIG. 11.
Figure 13:
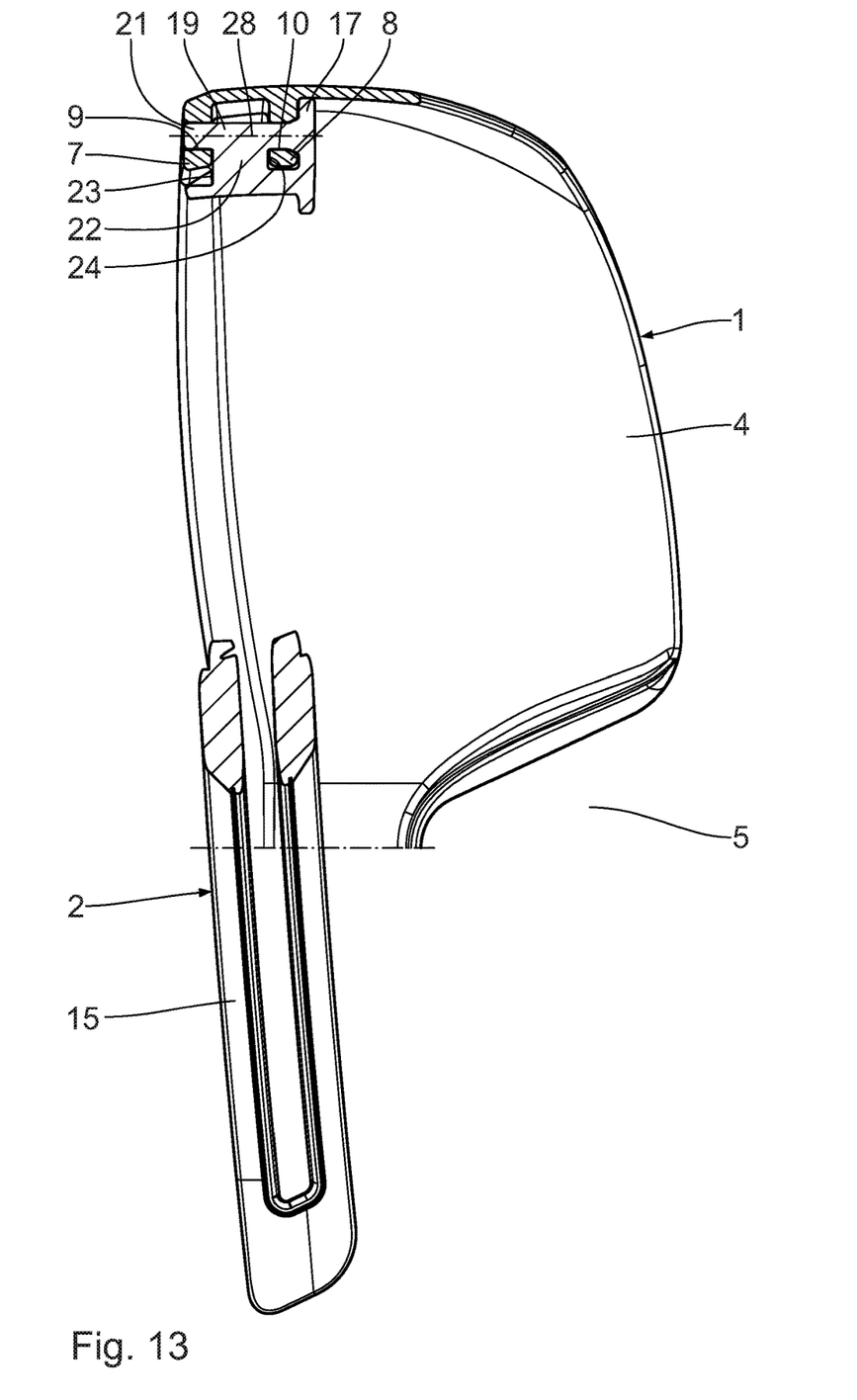
FIG. 13 is a sectional view in accordance with the sectional line XIII-XIII shown in FIG. 11.

Each bearing head 21 engages from below in the first bearing opening 9, while each bearing foot 20 is accommodated in the second bearing opening 10. Each bearing pin 19 or each temple arm 2 is thus movable in the supporting bearing openings 9, 10 about a respective pivot axis 28, with the formation of a pivot joint or bearing between a fully infolded transport position (FIGS. 11-13) and a fully outfolded wearing position (FIG. 1-6).

Each upper locking surface 23 is facing toward the first hinge lug 7 or it bears against the first hinge lug 7. Each lower locking surface 24 is facing toward the second hinge lug 8 or it bears against the second hinge lug 8. Each locking member 22 is thus accommodated in the respective locking member receptacle.

Each latching surface 26 is facing toward the second hinge lug 8 or the latching surface 26 bears against this same. Each abutment projection 35 is constantly facing toward the lens arrangement 1 and is arranged adjacent to this same or to the associated temple arm stroke cam 31.

When a temple arm 2 is in its fully outfolded wearing position in accordance with FIG. 14, the respective temple arm main body 15 bears against the pivot stop 30. The pivot stop 30 prevents a further pivoting of the respective temple arm 2 in a laterally outward direction. In addition, the supporting surface 37 and the abutment projection 35 bear, in particular with a side flank and/or a head region, between the pivot stop 30 and the crown 32, in a firmly pressing manner against the temple arm cam 31. A resistance is thus offered to a pivoting of the temple arm 2 into its infolded transport position.

If this resistance is manually surmounted, the abutment projection 35, through pivoting of the temple arm 2, slides along the temple arm stroke cam 31 in the direction of the crown 32. The abutment projection 35 then reaches, through pivoting of the temple arm 2, the intermediate position shown in FIG. 15. In the crown 32, between the temple arm stroke cam 31 and the abutment projection 35 exists a maximal geometric overlay, which is illustrated in FIG. 15.

Before reaching the crown 32, the temple arm 2 automatically returns into its fully outfolded wearing position, which is attributable to the prevailing pressure between the temple arm stroke cam 31 and the abutment projection 35. The abutment projection 35 here slides along the temple arm stroke cam 31 or back again, which creates the corresponding pivot movement of the temple arm 2.

Once the abutment projection has passed the crown 32, the temple arm 2 moves automatically into its fully infolded transport position (FIG. 16), which in turn is attributable to the prevailing pressure between the temple arm stroke cam 31 and the abutment projection 35. The abutment projection 35 here slides along the temple arm stroke cam 31, which creates the corresponding pivot movement of the temple arm 2. In the crown 32, a dead center of the temple arm stroke exists. The temple arm 2 is not forced into an end position.

In the fully infolded transport position, the abutment projection 35 is located adjacent to the inner end region 33 on the temple arm stroke cam 31. The same applies to a reverse pivoting of the temple arm 2.

Figure 9:
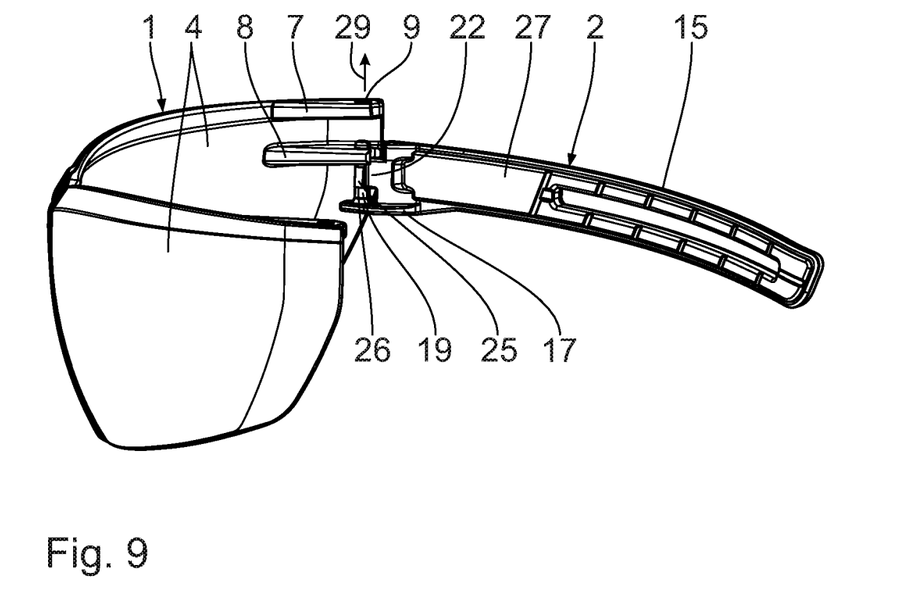
FIG. 9 is a side view, resembling FIG. 3, of the spectacles according to the invention, wherein the temple arm is somewhat infolded and is in an insertion position.

The assembly of a temple arm 2 is described below. As is shown by FIG. 9, the bearing pin 19 of the temple arm 2 to be assembled is firstly introduced with its bearing head 21, in an insertion direction or assembly direction 29, from below into the second bearing opening 10.

After this, the lens arrangement 1 and the temple arm 2 are oriented or pivoted relative to each other in such a way about the pivot axis 28 that the locking member insertion opening 11 and the locking member 22 lie one above the other. Alternatively, the described orientation of the lens arrangement 1 and of the temple arm 2 already takes place prior to the introduction of the bearing pin 19 into the second bearing opening 10.

The bearing pin 19 is subsequently fed further axially along the insertion direction 29 in the direction of the first bearing opening 9, wherein the bearing pin 19 passes from below into the second bearing opening 10, and the locking member 22 passes from below through the locking member insertion opening 11. The lead-in walls 12, 13 are here arranged adjacent to the locking member 22 or facing toward this same. The latching projection 25 here acts on the inside of the second hinge lug 8 and widens this same in an elastically resilient manner. The lead-in walls 12, 13 are hereupon moved further apart.

Figure 10:
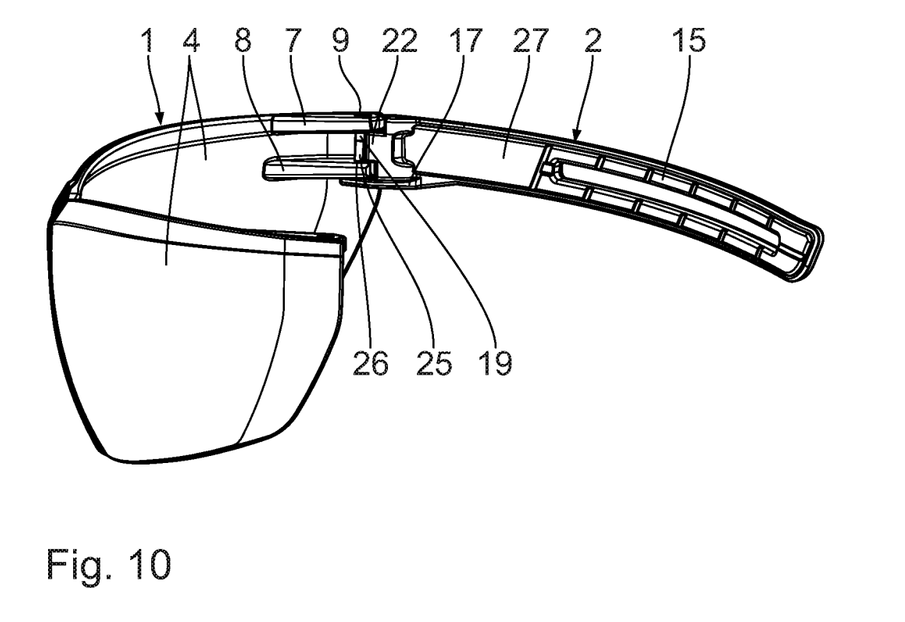
FIG. 10 is a view in accordance with FIG. 9, wherein the temple arm is in its assembly position.

As soon as the latching projection 25 has passed fully through the second hinge lug 8, the second hinge lug 8 springs or snaps back into its original position, so that the latching projection 25 overgrips with its latching surface 26 the second hinge lug 8. The supporting plate 17 prevents the bearing pin 19 from being inserted too far into the bearing arrangement 6. It forms an insertion stop. The bearing pin 19 is thus axially fixed in the temple arm bearing arrangement 6. The bearing head 21 engages in the first bearing opening 9 (see FIG. 10). The locking member 22 is here hitherto inactive. The temple arm 2 is in the temple arm assembly position.

After this, the temple arm 2 is pivoted about the pivot axis 28 into its outfolded wearing position (FIGS. 1 to 6) or infolded transport position (FIGS. 11 to 13), whereupon the locking member 22 is active. The locking member 22 is thus pivoted into the locking member receptacle between the hinge lugs 7, 8 and prevents accidental detachment of the lens arrangement 1 and of the temple arm 2 one from the other. Said locking member is now active and prevents or limits a displacement of the temple arm 2 and of the lens arrangement 1 along the bearing pin 19. The latching projection 25 is now substantially unnecessary. The other temple arm 2 is assembled analogously.

While specific embodiments of the invention have been shown and described in detail to illustrate the application of the principles of the invention, it will be understood that the invention may be embodied otherwise without departing from such principles.

The invention claimed is:

1. A pair of spectacles comprising:
   a lens arrangement having two lateral temple arm bearing arrangements, each of the temple arm bearing arrangements having a first hinge lug having a first bearing opening, a second hinge lug having a second bearing opening situated opposite the first bearing opening and at least one locking member insertion opening configured in one of the first hinge lug and the second hinge lug;
   two temple arms, each of the two temple arms comprising a temple arm main body, a bearing pin integrally connected to the temple arm main body and at least one locking member, wherein the bearing pin is pivotably connected to the first bearing opening and the second bearing opening of one of the temple arm bearing arrangements in an assembled state, the bearing pin having at least one latching projection having at least one latching surface, the at least one latching surface being oriented counter to a temple arm assembly direction and, in the assembled state of one of the two temple arms located in a temple arm assembly position, the at least one latching surface facing toward an adjacent hinge lug in order to prevent disassembly, wherein in the assembled state, the at least one locking member is arranged between the first hinge lug and the second hinge lug of a respective temple arm bearing arrangement, and in a pivot position of a respective temple arm that is different from the temple arm assembly position, the at least one locking member holds together the respective temple arm and the lens arrangement; and a temple arm stroke for moving the respective temple arm into an adjacent end position.

2. The spectacles as claimed in claim 1, wherein the at least one latching surface, in the assembled state of the temple arm located in the temple arm assembly position, latchingly overgrips the adjacent hinge lug in order to prevent disassembly.

3. The spectacles as claimed in claim 1, wherein the at least one locking member adjoins the bearing pin of the respective temple arm.

4. The spectacles as claimed in claim 1, wherein the at least one locking member is spaced from at least one end of the bearing pin of the respective temple arm.

5. The spectacles as claimed in claim 1, wherein the at least one locking member insertion opening laterally adjoins one of the first bearing opening and the second bearing opening.

6. The spectacles as claimed in claim 1, wherein the at least one locking member insertion opening is open laterally outwardly opposite to one of the first bearing opening and the second bearing opening.

7. The spectacles as claimed in claim 1, wherein the at least one locking member insertion opening is offset from a temple arm wearing position in a direction of pivot.

8. The spectacles as claimed in claim 1, wherein the temple arm stroke comprises at least one of at least one abutment projection on one of the temple arms and at least one abutment projection on the lens arrangement, the temper arm stroke further comprising a temple arm stroke cam, assigned to the at least one abutment projection, on another one of the lens arrangement and the one of the temple arms.

9. The spectacles as claimed in claim 1, wherein the at least one locking member insertion opening is offset from a dead center of the temple arm stroke in a direction of pivot.

10. The spectacles as claimed in claim 1, wherein each bearing pin is connected to a respective temple arm main body via at least one supporting body.

11. The spectacles as claimed in claim 10, wherein the at least one supporting body forms an insertion stop for the bearing pin upon introduction of the bearing pin into the respective temple arm bearing arrangement.

12. The spectacles as claimed in claim 1, wherein each temple arm is assemblable by a linear insertion movement.

13. A method for assembling spectacles, the method comprising the steps:
providing a lens arrangement having two lateral temple arm bearing arrangements, each of the temple arm bearing arrangements having a first hinge lug having a first bearing opening, a second hinge lug having a second bearing opening situated opposite the first bearing opening and at least one locking member insertion opening configured in one of the first hinge lug and the second hinge lug;
providing two temple arms, each of the two temple arms comprising a temple arm main body, a bearing pin integrally connected to the temple arm main body and at least one locking member;
mutually orienting the at least one locking member of a respective temple arm and the at least one locking member insertion opening of one of the two lateral temple arm bearing arrangements of the lens arrangement in a direction of pivot; and
guiding a respective bearing pin through an associated hinge lug comprising the at least one locking member insertion opening, with simultaneous guidance of the at least one locking member through the at least one locking member insertion opening, wherein each bearing pin has at least one latching projection having at least one latching surface, the at least one latching surface being oriented counter to a temple arm assembly direction and, in an assembled state of one of the two temple arms located in a temple arm assembly position, the at least one latching surface facing toward an adjacent hinge lug in order to prevent disassembly, wherein the at least one latching projection, when the bearing pin is guided through the associated hinge lug having the at least one latching member insertion opening, resiliently widens the associated hinge lug at least in some areas, the spectacles having a temple arm stroke for moving the respective temple arm into an adjacent end position.

14. The method as claimed in claim 13, further comprising pivoting the respective temple arm and the at least one locking member relative to each other in order to hold together the lens arrangement and the temple arm.

15. The spectacles as claimed in claim 1, wherein the spectacles are industrial safety spectacles.

* * * * *